(12) United States Patent
Hassan

(10) Patent No.: US 10,797,731 B2
(45) Date of Patent: Oct. 6, 2020

(54) SOFTWARE DEFINED RADIO FOR AUXILIARY RECEIVER

(71) Applicant: Microsoft Technology Licensing, LLC, Redmond, WA (US)

(72) Inventor: Amer Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 15/455,440

(22) Filed: Mar. 10, 2017

(65) Prior Publication Data
US 2018/0262217 A1 Sep. 13, 2018

(51) Int. Cl.
| | | |
|---|---|---|
| H04B 1/00 | (2006.01) | |
| H04L 12/24 | (2006.01) | |
| H04W 24/08 | (2009.01) | |
| H04W 4/00 | (2018.01) | |

(52) U.S. Cl.
CPC ....... *H04B 1/0003* (2013.01); *H04L 41/0896* (2013.01); *H04W 4/00* (2013.01); *H04W 24/08* (2013.01)

(58) Field of Classification Search
None
See application file for complete search history.

(56) References Cited

U.S. PATENT DOCUMENTS

| | | |
|---|---|---|
| 8,682,338 B2 | 3/2014 | Lemson et al. |
| 8,787,873 B1 | 7/2014 | Hitt et al. |
| 9,455,897 B2 | 9/2016 | Krishnaswamy et al. |
| 2003/0158954 A1* | 8/2003 | Williams ................ H04L 29/06 709/230 |
| 2006/0046716 A1 | 3/2006 | Hofstaedter et al. |
| 2006/0193295 A1 | 8/2006 | White et al. |
| 2006/0193300 A1* | 8/2006 | Rawat ............... H04W 12/1204 370/338 |
| 2006/0223514 A1 | 10/2006 | Weaver et al. |
| 2006/0227736 A1 | 10/2006 | Conyers et al. |
| 2007/0076649 A1 | 4/2007 | Lin et al. |

(Continued)

OTHER PUBLICATIONS

"International Search Report and Written Opinion Issued in PCT Application No. PCT/US18/020340", dated Jun. 5, 2018, 12 Pages.

(Continued)

*Primary Examiner* — Andre Tacdiran
(74) *Attorney, Agent, or Firm* — NovoTechIP International PLLC (57) ABSTRACT

A first base station may be configured as an auxiliary receiver for a data stream sent on an uplink from a source device to a second base station. The second base station may be a base station that is engaged in conventional communications with the source device on uplink and downlink channels using a selected protocol. The first base station may be used to provide extra data redundancy/QoS for a data stream sent from the source device to a destination device through the second base station. The first base station may determine that it has available bandwidth and is able to serve as an auxiliary receiver. The first base station may be asked by the second base station to provide extra bandwidth when certain network conditions occur. The first base station may include a software defined radio (SDR) that may be configured to receive according to the selected protocol.

22 Claims, 5 Drawing Sheets

(56) References Cited

U.S. PATENT DOCUMENTS

| | | |
|---|---|---|
| 2008/0112361 A1 | 5/2008 | Wu |
| 2008/0225850 A1* | 9/2008 | Oran ................... H04L 65/608 370/392 |
| 2008/0232391 A1* | 9/2008 | Spinar ................. H04W 28/20 370/449 |
| 2008/0279128 A1 | 11/2008 | Hassan et al. |
| 2010/0130187 A1* | 5/2010 | Yu ........................... G06F 8/61 455/418 |
| 2010/0130193 A1* | 5/2010 | Li ......................... H04W 28/08 455/424 |
| 2011/0190029 A1* | 8/2011 | Parssinen ............. H04B 1/0028 455/552.1 |
| 2012/0003940 A1* | 1/2012 | Hirano ............. H04W 74/0816 455/67.13 |
| 2012/0044858 A1* | 2/2012 | Li ......................... H04W 88/04 370/315 |
| 2012/0087273 A1* | 4/2012 | Koo ....................... H04B 7/024 370/252 |
| 2012/0190356 A1* | 7/2012 | Zhao ..................... H04L 5/0035 455/422.1 |
| 2013/0017833 A1* | 1/2013 | Sakamoto ............ H04J 11/0053 455/436 |
| 2013/0157643 A1 | 6/2013 | Yoo et al. |
| 2013/0244640 A1* | 9/2013 | Viorel ................. H04W 56/0005 455/422.1 |
| 2013/0336196 A1* | 12/2013 | Abraham .............. H04L 1/1628 370/315 |
| 2014/0023046 A1* | 1/2014 | Ma ....................... H04L 1/0618 370/331 |
| 2014/0064141 A1* | 3/2014 | Agrawal ................ H04W 24/00 370/254 |
| 2014/0153674 A1 | 6/2014 | Stratigos |
| 2014/0169341 A1 | 6/2014 | Zhang et al. |
| 2014/0241317 A1* | 8/2014 | Jamadagni ............ H04L 5/0032 370/331 |
| 2014/0329554 A1* | 11/2014 | Froberg Olsson .. H04W 52/244 455/522 |
| 2015/0131535 A1* | 5/2015 | Wallentin .............. H04W 76/15 370/329 |
| 2015/0382258 A1* | 12/2015 | Schmidt ................ H04W 48/16 455/440 |
| 2015/0382336 A1 | 12/2015 | Zhang et al. |
| 2016/0119812 A1* | 4/2016 | Owan ................ H04W 28/0236 370/230 |
| 2016/0198396 A1* | 7/2016 | Yoon ....................... H04W 4/80 455/434 |
| 2016/0255531 A1 | 9/2016 | Stein et al. |
| 2016/0338039 A1 | 11/2016 | Van der velde et al. |
| 2016/0345196 A1* | 11/2016 | Frydman ............ H04W 28/0289 |
| 2017/0048838 A1* | 2/2017 | Chrisikos .......... H04W 72/0406 |
| 2017/0150426 A1* | 5/2017 | Goldfarb ................. H04W 8/02 |
| 2017/0289878 A1* | 10/2017 | Ou ........................ H04L 45/74 |
| 2017/0373790 A1* | 12/2017 | Curtis ................... H04L 1/0006 |
| 2018/0124096 A1* | 5/2018 | Schwartz .............. H04W 24/04 |
| 2018/0183702 A1* | 6/2018 | Glik ..................... H04W 24/08 |

OTHER PUBLICATIONS

Shao, et al., "An Indoor Hybrid WiFi-VLC Internet Access System", in Proceedings of IEEE 11th International Conference on Mobile Ad Hoc and Sensor Systems, Oct. 28, 2014, pp. 1-13.

* cited by examiner

SOFTWARE DEFINED RADIO FOR AUXILIARY RECEIVER

BACKGROUND

Wireless communications for media applications requires high quality of service (QoS) both on the uplink (from a source wireless device to a network eNodeB/access point (AP)) and on the downlink (from a network eNodeB/AP to a destination wireless device) directions. It is commonly understood that the downlink, as the last link ("last mile", or "last access"), is a bottleneck for performance. However, it is not uncommon that the uplink from the source wireless device may be the limiting factor on performance. For example, uplink performance may suffer due to the limited transmission power that is available on small battery powered portable devices, while the downlink may be provided abundant eNodeB/AP transmission power. Also, the fact that the eNodeB AP is a device integrated into the network infrastructure may allow more efficient link management for the downlinks. Most networks, therefore, exhibit unbalanced performance between uplink and downlink.

SUMMARY

This summary is provided to introduce a selection of concepts in a simplified form that are further described below in the Detailed Description. This summary is not intended to exclusively or exhaustively identify key features or essential features of the claimed subject matter. Nor is it intended as an aid in determining the scope of the claimed subject matter.

The embodiments provide implementations of a base station that may function as an auxiliary base station. The auxiliary base station includes a software defined radio (SDR) receiver that may be configured to operate as an auxiliary receiver on the uplink for a data stream sent from a source device to a primary base station. The auxiliary base station may be used to provide extra data redundancy/QoS for uplink transmissions of source device that is engaged in uplink and or downlink communications with a primary base station using a selected protocol and sending a data stream to a destination device. The auxiliary base station may determine that it has available bandwidth and is able to serve as an auxiliary receiver. The auxiliary base station may also be asked by a network controller or the primary base station to provide extra bandwidth when certain network conditions occur that negatively affect uplink quality for the source device. In order to configure itself as an auxiliary receiver, the auxiliary base station may scan uplink transmissions and determine the selected protocol of the source device. Alternately, the auxiliary base station may determine the selected protocol that the source device is using by receiving an indication of the protocol from the primary base station, a network controller, or from the source device. The auxiliary base station may then configure itself by retrieving code for the appropriate protocol from a database, either stored in the auxiliary base station or located remotely to the auxiliary base station. The code may also be retrieved from a cloud service managed by a third party. The auxiliary base station may then begin to intercept/receive the full data stream, or only a partial data stream, on the uplink from the source device. The data stream received on the uplink at the auxiliary base station may be forwarded onward from the auxiliary base station to the destination device as a data stream that is redundant to the data stream received at the primary base station on the uplink. A device along the transmission path to the destination device then may use the redundant data stream forwarded from the auxiliary base station to enhance overall performance and quality of the data at the destination device. For example, data combining techniques may be used in the destination device to combine the data stream front the primary base station and the redundant data stream from the auxiliary base station. In other implementations, the data combining may be performed elsewhere along the transmission path such as at a destination base station that sends the combined data streams to the destination device over a downlink channel.

In an implementation, a base station may include a SDR receiver configured to allow the base station to operate as an auxiliary receiver. In an example implementation, the base station may include a wideband receiver bank and a digital physical/media access control (PHY/MAC) layer receiver. In this example, the SDR receiver may use a protocol analyzer to determine the protocol used by the source device on the uplink to the primary base station, and then configure the digital PHY/MAC layer receiver for that protocol when operating as art auxiliary receiver. Also, the digital PHY/MAC layer receiver may be configured to operate according to another protocol when operating as a primary base station. In another example, the base station may include a receiver hank for a wireless system, for example, a fifth Generation (5G) receiver bank, and include an additional receiver having SDR configurable capability. The additional receiver may be, for example, a digital Wi-Fi receiver configurable to operate according to various Wi-Fi protocols. The base station may use a protocol analyzer to determine the particular Wi-Fi protocol used by the source device on the uplink to the primary base station. The base station may then configure the additional receiver as the auxiliary receiver for that Wi-Fi protocol.

In another implementation, the base station may transmit a beacon alerting some devices of the capability of the base station to operate as an auxiliary receiver. In an example of this implementation, the base station may transmit information on the beacon about one or more protocols according to which the base station may provide auxiliary reception for the source devices on the uplink.

DETAILED DESCRIPTION

The system, method and apparatus will non be described by use of example embodiments. The example embodiments are presented in this disclosure for illustrative purposes, and not intended to be restrictive or limiting on the scope of the disclosure or the claims presented herein.

The embodiments of the disclosure provide systems, apparatus, and methods that allow a first base station to be configured to operate as an auxiliary receiver for a data stream sent on an uplink from a source device to a second base station. The second base station may be a base station that is engaged in conventional 2-way communications with the source device as the primary base station while operating in a primary mode, for example, on uplink and downlink channels using a selected (usually identical) protocol. The first base station may be used to provide extra data redundancy/QoS for a data stream sent on the uplink from the source device to a destination device through the second base station. The first base station may determine that it has available bandwidth and is able to serve as an auxiliary receiver. The first base station may also be asked by a network controller or the second base station to provide extra bandwidth when certain network conditions occur that negatively affect uplink quality for the source device. The first base station may include a software defined radio (SDR) receiver that may be configured to receive according to the selected protocol when the first base station is operating as an auxiliary receiver. The term "base station" as used in this disclosure includes a base station, a terminal, an access point (AP), or any other apparatus that communicates with a wireless device to provide access to any type of network, for example a cellular network, a Wi-Fi network, the internet, or a local access network (LAN).

Use of a SDR receiver according to the embodiments provides an advantage in that the first base station may operate as an auxiliary receiver for a source device by utilizing a protocol selected from one or more protocols in scenarios when uplink bandwidth/resources provided to the source device by a second or primary base station are not adequate. For example, when the first base station has available bandwidth it may be flexibly configured to provide uplink support for a variety of protocols when the uplinks in a system become overloaded. Using the first base station as an auxiliary receiver allows the resources of the first base station to be utilized in situations where the first base station would otherwise be idle and not utilized. If the resources of the first base station are needed for operation in primary mode, the first base station may switch back to primary mode from auxiliary mode. For example, depending on the hardware configuration, the first base station may be used to flexibly provide uplink support in systems operating according to one or more protocols such as the various IEEE 802.11 Wi-Fi protocols, 3rd Generation Cellular (3G), $4^{th}$ Generation Cellular (4G) wide band code division multiple access (WCDMA), and Long Term Evolution (LTE) Cellular when a system needs the support and the first base station has available resources. The first base station may operate in a primary mode to provide conventional uplink and downlink communications to devices using, for example, any of the IEEE 802.11 Wi-Fi, 3rd Generation Cellular (3G), $4^{th}$ Generation Cellular (4G), wide band code division multiple access (WCDMA), or Long Term Evolution (LTE) Cellular protocols. Then when operating in auxiliary mode, the first base station may configure itself as an auxiliary receiver as needed to provide uplink support using any of above protocols that it does not use for conventional uplink and downlink communications. The first base station may switch between primary mode and auxiliary mode as resource availability and resource requirements allow. Programs and code may be retrieved by the first base station for the SDR receiver as needed to configure the SDR receiver for the appropriate protocol. The embodiments allow flexible operation of a base station as an auxiliary receiver. For example, in one implementation the auxiliary receiver may be configured in one or more base stations implemented as micro-base stations that cover an area such as a mall, a hotel, a transportation hub, or other similar public/private areas to provide service according to a cellular protocol.

The term micro-base station as used in this specification means a low power base station that covers a relatively small area compared to conventional base stations. For example, while a conventional cellular base station may cover an area of up to 22 kilometers, a micro-base station may use power control to limit the radius of its coverage area. In one application, a micro-base station may provide coverage in an area of 2 kilometers or less (microcell). A micro-base station also includes a base station that provides coverage of an area on the order of 200 meters or less (picocell), or of an area of 10 meters or less (femtocell). Micro-base stations may be used to add network capacity in areas with very dense mobile device usage, such as train stations and are often deployed temporarily during sporting events and other occasions in which extra capacity is known to be needed at a specific location in advance. Use of micro-base stations with power control implemented in wireless networks makes it easier to prevent interference from nearby cells using the same frequencies. By subdividing cells, and creating more cells to help serve high density areas, a wireless network operator can optimize the use of spectrum and increase capacity.

In the micro-base station scenario, when cellular traffic is low and one or more of the micro-base stations are not being used or not being fully utilized, the one or more unused micro-base stations may be used as auxiliary receivers. When used as an auxiliary receiver each of the one or more unused micro-base stations may intercept a data stream sent on an uplink from a source device to an access point (AP) or base station according to a local network protocol different from the cellular protocol used by the unused micro-base station, and provide a redundant data stream at a destination device. For example, the cellular protocol may be a fifth generation (5G) protocol and the local network protocol may be a Wi-Fi protocol. In order to function as an auxiliary receiver, a micro-base station may first determine the protocol used by the source device, and then self-configure to receive according to that protocol. Micro-base stations according to this implementation may be used to add network capacity in areas with very dense mobile device usage, such as train stations and may also be deployed temporarily during sporting events and other occasions in Which extra capacity is known to be needed at a specific location in advance. While these micro-base stations are primarily added to provide cellular coverage, the ability to configure the micro-base stations to function as auxiliary receivers may be utilized, for example, to enhance QoS for data streams sent on the uplinks of a local Wi-Fi system that includes one or more APs.

In one example of this implementation, the source devices that generate/send the data streams and the APs that receive the data streams need not be aware of the auxiliary receiver operation. In this case, the micro-base stations may determine the protocol used by source devices by scanning and protocol analysis. This allows flexible installation and removal of the micro-base stations in the coverage areas of networks in which the micro-base stations may operate as auxiliary receivers. In another example, the APs may be aware of the auxiliary receiver operation of the micro-base stations. In this case applications may be installed on the APs and on the micro-base stations that allow information to be exchanged between the APs and micro-base stations to facilitate the operation of the micro-base stations as auxiliary receivers. For example, the APs may send requests to the micro-base station requesting bandwidth for a particular protocol. In a further example, a network controller may be implemented to coordinate the operation of the micro-base stations as auxiliary receivers While implementations of the embodiments are described as using micro-base stations, the embodiments may be implemented in networks using any type of base station, or combination of types of base stations, where the disclosed techniques may provide an advantage.

Figure 1:
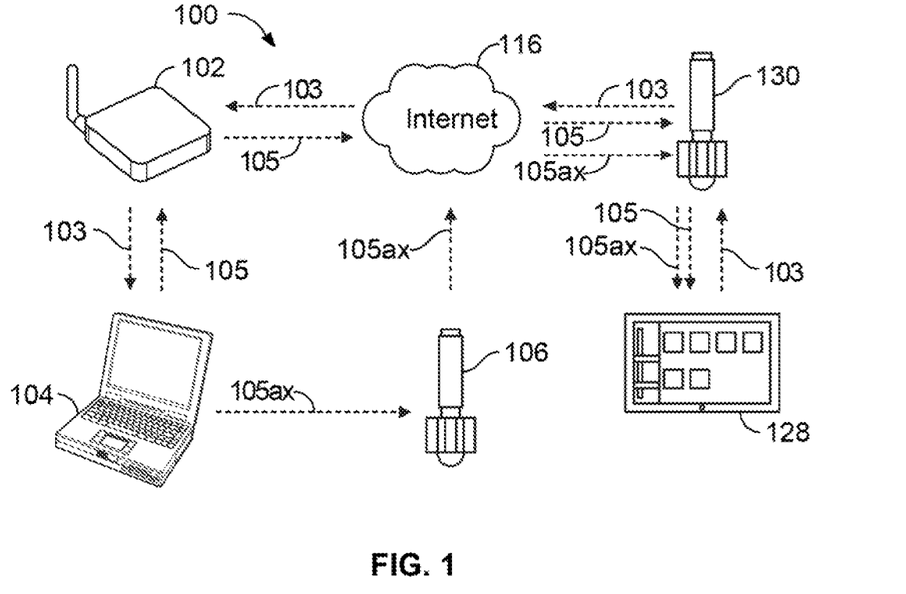
FIG. 1 is a diagram illustrating a system including an example base station operable as an auxiliary receiver.

FIG. 1 is a diagram illustrating a system including an example implementation of a base station operable as an auxiliary receiver. System 100 includes base station 102 and base station 106. Base station 102 may be implemented as a Wi-Fi access point (AP) and base station 106 may be implemented as a 5G micro-base station. System 100 also includes base station 130, which ma be implemented as a 5G micro-base station. Base stations 102, 106 and 130 may configured to communicate with one another through a network implemented, for example, by communication paths through internet 116. In FIG. 1, device 104 and device 128, which are shown as an example laptop computer and an example tablet computing device, respectively, communicate with each other through internet 116 using base stations 102 and 130. In an example, device 104 and device 128 may be communicating data streams for a user application such as a video/voice call application or another multimedia application that uses high data rate transmissions. Device 104 is shown sending an uplink data stream 105 to base station. Base station 102 then routes data stream 105 through the internet 116 to base station 130 which sends data stream 105 to device 128 on the downlink (DL) between base station 130 and device 128. Device 104 is also shown receiving data stream 103 from base station 102 on the downlink (DL) channel between base station 102 and device 104. Data stream 103 has originated at device 128 which sends data stream 103 to base station 130 on the uplink (UL) between device 128 and base station 130. Base station 130 then routes data stream 103 through the internet 116 to base station 102 for sending to device 104.

In the implementation of FIG. 1, base station 106 may operate as an auxiliary receiver in auxiliary mode to provide extra data redundancy/QoS for base station 102 for data stream 105 when base station 106 has available bandwidth. In this scenario, base station 106 may intercept data stream 105 (as sent to base station 102 on the LT between device 104 and base station 102) as data stream 105ax using a Wi-Fi SDR and forward the intercepted data stream onward to internet 116 as redundant data stream 105ax for routing to base station 130 which then sends data stream 105ax to device 128 on the downlink channel (DL) between base station 130 and device 128 as redundant data stream 105ax. Device 128 may then combine the data streams 105 and 105ax utilizing the redundant data stream 105ax for more accurate data decoding and better quality of service for the application with which the two devices are communication.

For example, in one implementation, device 128 may determine that data stream 105 and redundant data stream 105ax are related by analyzing the source address of each data stream. The two data streams 105 and 105ax may then be combined at the physical layer, provided to the network layer, and then provided to the destination application in device 128. The destination application may combine the two data streams 105 and 105ax using redundancy/error correction/combining techniques and process the bits for appropriate use at the application. The combining may be done using, for example, selective combining, maximal ration combining, or equal gain combining.

In certain implementations, base station 106 may be configured with applications that allow it to operate as an auxiliary receiver when communicating with other devices in the system. For example, base station 106 may be configured to communicate wirelessly, or through the internet, with base station 102 so that base station 102 may send requests fir auxiliary bandwidth to base station 106, and base station 106 may respond appropriately. Base station 106 may also be configured to communicate with other devices in the network so that base station 106 may receive requests for bandwidth from these other devices. For example, a network controller may be configured in the system infrastructure or in the internet 116 to communicate with base station 106 so that requests for bandwidth may be received from the network controller. The network controller may be a device that manages bandwidth use in the system. In another example, base station 106 and device 104 may be configured to communicate so that base station 106 may receive requests for bandwidth from device 104. In these implementations, each of the communicating devices may be equipped with an application that allows each device to be aware of each other's location and/or address in the system (for example an IP address) and send/receive appropriate communication signals. In one implementation, an initial registration of base station 106 for setup of the communications with other devices in the system 100 may be performed upon installation/activation of base station 106.

In one example implementation, base station 106 may also function to operate it primary mode as a conventional 5G micro base station to provide uplink/downlink communications through the internet with any other 5G devices that move into the coverage area of base station 106. When there is a light load of 5G devices or no 5G devices in the coverage area of base station 106 and bandwidth resources are available, base station 106 may configure itself to intercept the Wi-Fi data stream 105 and provide extra redundancy for base station 102 for data stream 105 (thereby improving the bandwidth of base station 102 and/or reducing the error rate of base station 102). In another example implementation, base station 106 may function as a dedicated auxiliary receiver for uplink transmissions of devices such as device 104. In this implementation, base station 106 may not have a primary mode of operation. When base station 106 has available bandwidth it may configure its SDR to intercept uplink data streams transmitted from various devices using various protocols, depending on the devices, to provide data redundancy to the devices for their uplink transmissions.

Devices 104 and 128 may be any type of mobile device such as a smart phone or laptop computer. Each of the devices 104 and 128 may also be alternatively implemented as any other type of device such as, for example, desktop PCs, gaming devices, media devices, smart televisions, home theater systems, smart automobile systems, smart house systems, multimedia cable/television boxes, smart phone accessory devices, tablet devices, tablet accessory devices, personal digital assistants (PDAs), portable media players, smart watches, smart sensors, or industrial control systems. In other example implementations of FIG. 1, base station 102 and/or base station 106 may be configured according to any other wireless interface standard such as 3GPP Wide Band Code Division Multiple Access (WCDMA), 3GPP Long Term Evolution (LTE), or another wireless interface standard. Base station 106 may then be configured to provide auxiliary radio service based on an appropriate protocol of base station 102.

In an example implementation of FIG. 1, the operation of base station 106 to provide data redundancy to device 104 may be initiated by a request for bandwidth received at base station 106 from base station 102, a request received from device 104, or a request received from a network controller implemented in internet 116. In this case, base station 106 may use protocol information received with the request for bandwidth to configure its SDR receiver to intercept data stream 105 using the appropriate protocol.

In another example implementation, the operation of base station 106 to provide data redundancy to device 104 may be self-initiated at base station 106 when base station 106 has available bandwidth. In this case, base station 106 may scan uplink transmissions from device 104 to determine the protocol used by base station 102 and configure its SDR receiver to intercept data stream 105 according to the determined protocol. In this case, the operation of base station 106 may be transparent to device 104 and base station 102.

Figure 2A:
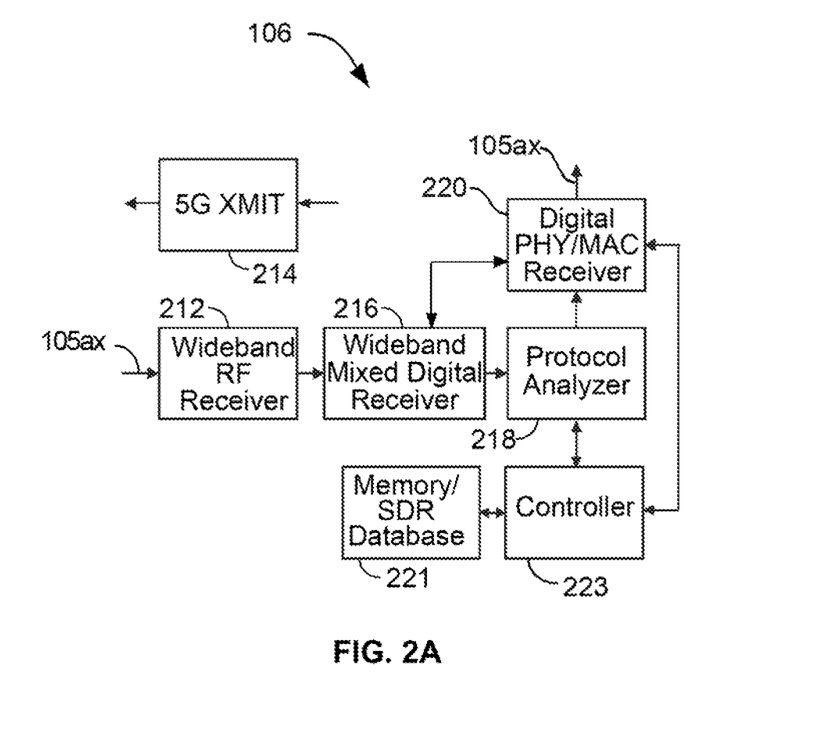
FIG. 2A is a simplified diagram illustrating an example SDR receiver in a base station operable as an auxiliary receiver.
Figure 2B:
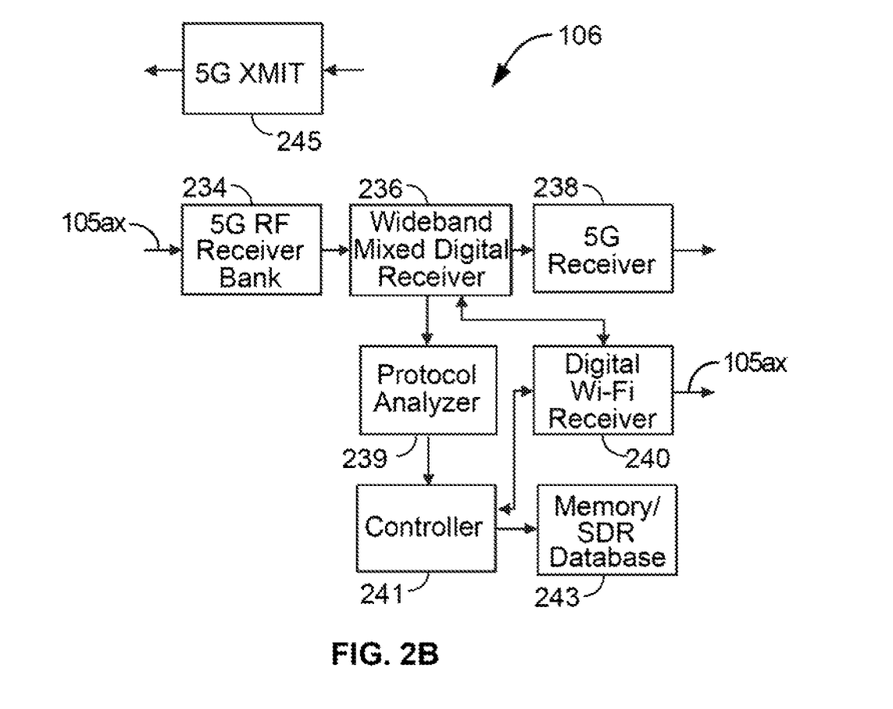
FIG. 2B is a simplified diagram illustrating another example SDR receiver in a base station operable as an auxiliary receiver.

FIGS. 2A and 2B are simplified functional diagrams showing example implementations of base station 106 of FIG. 1. Each of FIGS. 2A and 2B show a different example implementation according to which base station 106 may be implemented.

FIG. 2A shows an example implementation of base station 106 in which base station 106 scans uplink transmissions from device 104 to determine the protocol used by device 104. FIG. 2A illustrates functions by which base station 106 determines the protocol used by device 104 on the uplink and configures itself to intercept the uplink data stream 105ax sent by device 104. In the implementation of FIG. 2A, base station 106 may include wideband RF receiver 212, wideband mixed digital receiver 216, protocol analyzer 218, digital physical/media access control (PHY/MAC) receiver 220, controller 223, memory SDR database 221, and 5G transmitter (XMIT) 214. The functions of the various components in the implementations of base station 106 shown in FIG. 1A will be described below in relation to the process of FIG. 3.

In the implementation of FIG. 2A, base station 106 may operate in both of a primary mode and an auxiliary mode. When operating in primary mode, base station 106 may provide uplink and downlink communications to devices in a conventional manner. For example, 5G transmitter (XMIT) 214 may be utilized for the downlink in primary mode. Also, in primary mode, wideband RF receiver 212, wideband mixed digital receiver 216, and digital physical/media access control (PHY/MAC) receiver 220 may be utilized by configuring digital physical/media access control (PHY/MAC) receiver 220 to operate according to the appropriate 5G protocol. In this implementation, if base station 106 is in primary mode when base station 106 has determined that it is to operate as an auxiliary receiver, base station 106 may switch to operate in auxiliary mode through the process of FIG. 3.

Figure 3:
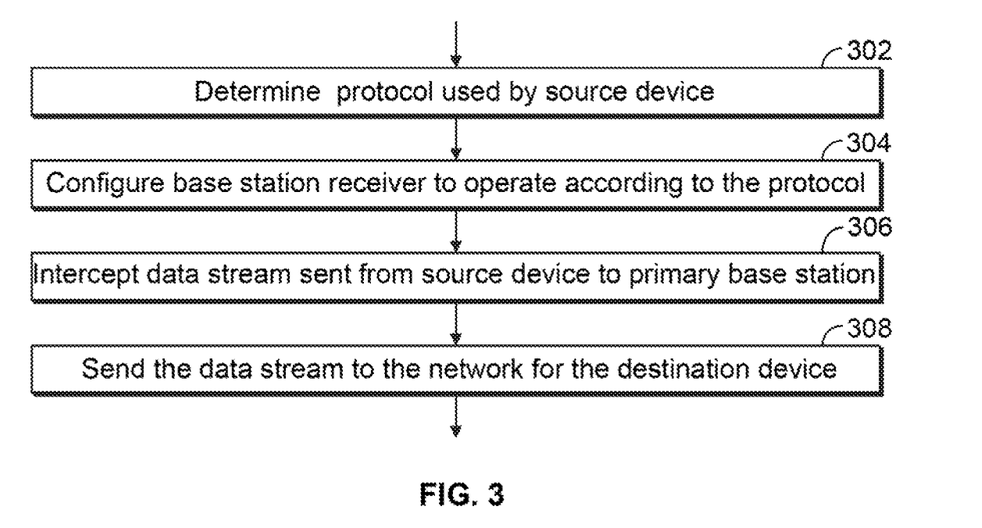
FIG. 3 is a flow diagram of example operations performed by a base station operating as an auxiliary receiver.

FIG. 3 shows basic operations that may be performed in the implementations of base station 106 shown in FIG. 2A.

At 302, when base station 106 has determined that it is to operate as an auxiliary receiver, for example, because base station 106 is operating in self initiation mode and has determined it has available bandwidth, controller 223 controls base station 106 to determine a protocol used on the uplink by devices such as source device 104. To do this, controller 223 causes wideband RF receiver 212 to scan a range of frequencies of protocols that device 104 could be using to send uplink data. In the implementation of FIG. 2A wideband RF receiver 212 scans and receives data stream 105. The scanned transmissions are then converted into digital signals at wideband mixed digital receiver 216 and provided to protocol analyzer 218. Protocol analyzer 218 identifies the protocol used to transmit data stream 105 using protocol analysis and provides a protocol indication to controller 223. For example, protocol analyzer 218 may identify the protocol as a particular Wi-Fi protocol, for example Wi-Fi 802.11ag, and provide the protocol indication to controller 223.

At 304, controller 223 then retrieves SDR code for the protocol from memory/SDR database 221 and configures the software definable radio (SDR) portion of the digital PHY/MAC receiver 220 to receive and process the data stream 105ax according to the identified protocol. At 306, base station 106 intercepts the data stream 105ax sent from device 104 to base station 102 using PHY/MAC receiver 220. At 308, base station 106 then may then send the data stream front PHY/MAC receiver 220 to the internet 116 as redundant data stream 105ax. Redundant data stream 105ax may then be sent to base station 130, and sent from base station 130 to destination device 128.

In an alternative implementation, at 302 controller 223 may receive an indication of the protocol used by a source device from another device such as base station 102 or a network controller. At 304, controller 223 may then configure di stat PHY/MAC receiver 220 appropriately to function as an auxiliary receiver. The indication of the protocol may be included in a request for bandwidth sent to the base station 106 from base station 102 or from the network controller. The request for bandwidth may also identify a particular device, such as base station 102, or channels that need extra bandwidth. In another implementation, the indication of the protocol may be sent to base station 106 in response to base station 106 sending an indication that base station 106 has available bandwidth to another device such as base station 102 or a network controller.

FIG. 2B is a simplified diagram illustrating another example implementation of base station 106 of FIG. 1. In the implementation of FIG. 2B, base station 106 may function as an auxiliary Wi-Fi receiver or auxiliary 5G receiver in addition to its normal 5G base station functions. FIG. 2B illustrates functions by which base station 106 determines the protocol used by device 104 on the uplink and configures itself to intercept the uplink data stream 105ax sent by device 104. Base station 106 may include 5G RF receiver bank 234, wideband mixed digital receiver 236, protocol analyzer 239, 5G receiver 238, digital Wi-Fi receiver 240, controller 241, memory SDR database 243, and 5G transmitter (XMIT) 245. The functions of the components of base station 106 in the implementation of FIG. 2B may be described in relation the process of FIG. 3.

In the implementation of FIG. 2B, base station 106 may operate in both of a primary mode and an auxiliary mode. When operating in primary mode, base station 106 may provide uplink and downlink communications to devices in a conventional manner. For example, 5G transmitter (XMIT) 245 may be utilized for the downlink in primary mode. Also, in primary mode, 5G RF receiver bank 234, wideband mixed digital receiver 236, and 5G receiver 238 may be utilized to operate according to the appropriate 5G protocol. In this implementation, if base station 106 is in primary mode when base station 106 has determined that it is to operate as an auxiliary receiver, base station 106 may switch to operate in auxiliary mode through the process of FIG. 3.

When base station 106 has determined that it is to operate as an auxiliary receiver (for example, because base station 106 is operating in self initiation mode and has determined it has available bandwidth), controller 241 may determine a protocol used by devices such as source deice 104. Controller 241 may do using 5G RF receiver bank 234 to scan a range of frequencies of Wi-Fi and 5G protocols with which the devices such as device 104 could be sending uplink data stream 105. In the implementation of FIG. 2B, 5G RF receiver bank 234 scans and receives data stream 105. The scanned transmissions are then converted into digital signals at wideband mixed digital receiver 236 and provided to protocol analyzer 239. Protocol analyzer 239 identifies the protocol using protocol analysis and provides a protocol indication to controller 241. For example, protocol analyzer may provide controller 241 with an indication of a particular Wi-Fi protocol that is used by device 104.

At 304, controller 241 then retrieves the SDR code for the indicated protocol from memory/SDR database 243 and configures the software definable radio (SDR) portion of the digital Wi-pi receiver 240 to receive and process the data stream 105ax at Wi-Fi receiver 240 according to the identified protocol. At 306, base station 106 intercepts the data stream 105 sent from device 104 to base station 102 as data stream 105ax using digital Wi-Fi receiver 240. At 308, base station 106 may then send the data stream 105ax to the internet 116 for destination device 128 as redundant data stream 105ax. In other situations, if a device such as device 104 sends uplink transmissions using a 5G protocol base station 106 may function as an auxiliary receiver by using 5G receiver 238 to receive the 5G transmissions.

In an alternative implementation, base station 106 of FIG. 2B may be implemented without protocol analyzer 239. In this alternative, at operation 302, controller 241 may receive an indication of the protocol used from another device such as base station 102 or a network controller. At 304, controller 241 may then configure digital Wi-Fi receiver 240 appropriately or use the 5G receiver 238 to function as an auxiliary receiver. The indication of the protocol may be included in a request for bandwidth sent to the base station 106 from base station 102 or from the network controller. The request for bandwidth may also identify a particular device, such as base station 102, or channels that need extra bandwidth. In another implementation, the indication of the protocol may be sent to base station 106 in response to base station 106 sending an indication to, another device (such as base station 102 or a network controller) that base station 106 has available bandwidth.

In a further implementation, base station 106 may transmit a beacon alerting source devices of the capability of the base station to operate as an auxiliary receiver. For example, the base station 106 may transmit information on a Wi-Fi beacon about one or more protocols according to which the base station 106 may provide auxiliary reception on an uplink for devices such as source device 104. For example, source device 104 may utilize this information when the quality of the uplink on which the source device is transmitting to base station 102 falls below a certain level. When the uplink quality falls below the certain level, source device 104 may determine that base station 106 supports the protocol that source device 104 is using from the beacon and send a request for bandwidth to base station 106 for uplink bandwidth. The request for bandwidth may be sent from source device 104 to base station 106 on a paging channel using a protocol on which both source device 104 and base station 106 are able transmit and receive. The request fir bandwidth may include an indication of the protocol used by device 104 on the uplink. Base station 106 may then provide the requested bandwidth if it is able. In this implementation, source device 104 may also utilize the information that additional bandwidth is available to it by requesting the additional bandwidth, even though the uplink quality is acceptable. This may be done in order to increase uplink throughput and/or QoS for an application used on device 104. For example, source device may request the additional bandwidth automatically, in another example, an indication may be displayed to a use of source device 104 that additional bandwidth is available and the user may select to set uplink video or audio quality to a higher level based on having the additional bandwidth available.

Figure 4A:
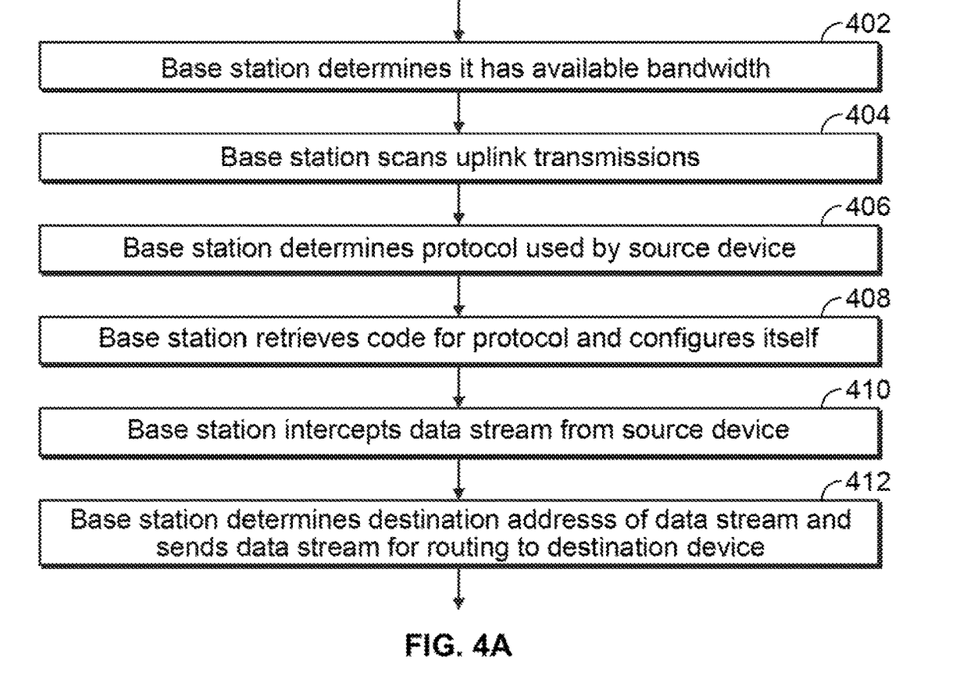
FIG. 4A is a flow diagram of example operations performed by a base station operating as an auxiliary receiver in a scan-protocol mode.

While FIGS. 2A and 2B have been described above using Wi-Fi and 5G as examples protocols, the use of the SDR receiver has application to any protocol or combinations of protocols. For example, base station 106 may operate in primary mode to provide conventional uplink and downlink communications to devices in system 100 using any of the IEEE 802.11 Wi-Fi, 3rd Generation Cellular (3G), $4^{th}$ Generation Cellular (4G), wide band code division multiple access (WCDMA), or Long Term Evolution (LTE) Cellular protocols. Then when operating in auxiliary mode, base station 106 may configure itself as needed to provide uplink support using any of above protocols that it does not use for conventional uplink and downlink communications. FIG. 4A is a flow diagram of example operations performed by a base station operating as an auxiliary receiver in a scan-protocol mode in scan-protocol mode the base station performs scanning and protocol analysis to determine protocols to use when functioning as an auxiliary receiver. FIG. 4A may be described using an example of base station 106 of FIG. 2B operating in the system of FIG. 1.

The process begins at 402 where base station 106 determines that it has available bandwidth. At 402, controller 241 may determine that base station 106 has available bandwidth and/or resources that can be used to provide auxiliary receiver services to devices, such as device 104, within its coverage area. Controller 241 may make this determination by monitoring communications with wireless devices that are in the coverage area of base station 106. For example, controller 241 may monitor the 5G uplink traffic load handled by one or more of 5G RF receiver bank 234, wideband mixed digital receiver 236, and/or 5G receiver 238. The uplink traffic load may include 5G traffic.

Controller 241 may monitor the traffic load over a time period, and if the traffic load remains below, or at, a selected level of traffic for the time period, controller 241 may determine that base station 106 has available bandwidth and/or resources to use as an auxiliary receiver. The selected level of traffic may be a value based on monitoring of one or more parameters indicative of traffic load on the uplink, such as total data throughput requirements, total data rate requirements, QoS, channel usage, etc. The selected level of traffic may be at any value raging from zero to a higher level of traffic and be set by the base station operator depending on the capabilities of base station 106. In another example, controller 241 may also make the determination by monitoring the number of active connections with wireless devices in base station 106's coverage area, and if the number of active connections is zero or below a certain number for a time period, controller 241 may determine that base station 106 has available bandwidth. Other parameters related to traffic load may also be considered in the determination. For example, the way in which uplink traffic patterns vary by according to time of day may be considered. In an example of this, during low traffic periods, base station 106 may determine it has available bandwidth based on less stringent requirements for traffic load, or with no requirements related to traffic load. Likewise, during high traffic periods, base station 106 may be less likely to determine that it has available bandwidth (e.g., based on more stringent requirements for traffic load).

At 404, base station 106 scans uplink transmissions of devices in its coverage area. Controller 241 may control wideband 5G RF receiver bank 234 and wideband mixed digital receiver 236 to receive and scan transmissions in the frequency bands that base station 106 is configured to provide auxiliary services. The scanned transmissions are then provided by wideband mixed digital receiver 236 to protocol analyzer 239. For example, base station 106 may be configured to provide auxiliary receiver services in particular Wi-Fi frequency bands using digital Wi-Fi receiver 240. In this case, controller 241 may control wideband 5G RF receiver bank 234 and wideband mixed digital receiver 236 to provide scanned transmissions in those particular Wi-Fi frequencies to protocol analyzer 239. For example, the Wi-Fi frequency bands scanned may be in the 2.5 GHz, 5.0 GHz, or television white space (TVWS) bands. In one example of FIG. 1, the scanning may receive transmissions of data stream 105 sent by device 104 on the uplink to base station 102 in the 5.0 GHz Wi-Fi band.

At 406, base station 106 determines the protocol used by a data stream source device. Protocol analyzer 239 may determine protocols used by any devices sending transmissions that were scanned. In the example of FIG. 1, protocol analyzer 239 may detect that device 104 is transmitting on the uplink to base station 102 in the 5 GHz band using a particular Wi-Fi protocol such as the IEEE 802.11g protocol. Protocol analyzer may provide an indication of the protocol used by device 104 to controller 241.

At 408, base station 106 retrieves code for the protocol and configures itself for that protocol. Controller 241 may retrieve an SDR code from memory/SDR database 243 to use in configuring digital Wi-Fi receiver 240 for the protocol used by device 104. Controller 241 then uses the retrieved SDR code to configure digital Wi-Fi receiver 240 to operate according to the correct protocol in order to receive transmissions from device 104. In other example implementations, controller 241 may retrieve the SDR code from a location remote to base station 106. For example, controller 241 could retrieve the SDR code from an internet database or a network controller.

At 410, base station 106 intercepts the data stream from the source device 104. Controller 241 may control 5G RF receiver bank 234, wideband mixed digital receiver 236, and digital Wi-Fi receiver 240 to intercept redundant data stream 105ax, as shown in FIG. 1. Then, at 412, controller 241 determines the destination address oldie data stream 105ax and sends the data stream 105ax to the internet 116 for routing to destination device 128. Destination device 128 may then receive data stream 105ax in parallel with data stream 105 as shown in FIG. 1.

In one implementation of FIG. 4A, base station 106 may function transparently as the auxiliary receiver, without device 104 and/or base station 102 having any knowledge of base station 106. This allows base station 106 to be set up and configured to provide auxiliary reception without the need to reconfigure device 104 and/or base station 102.

Figure 4B:
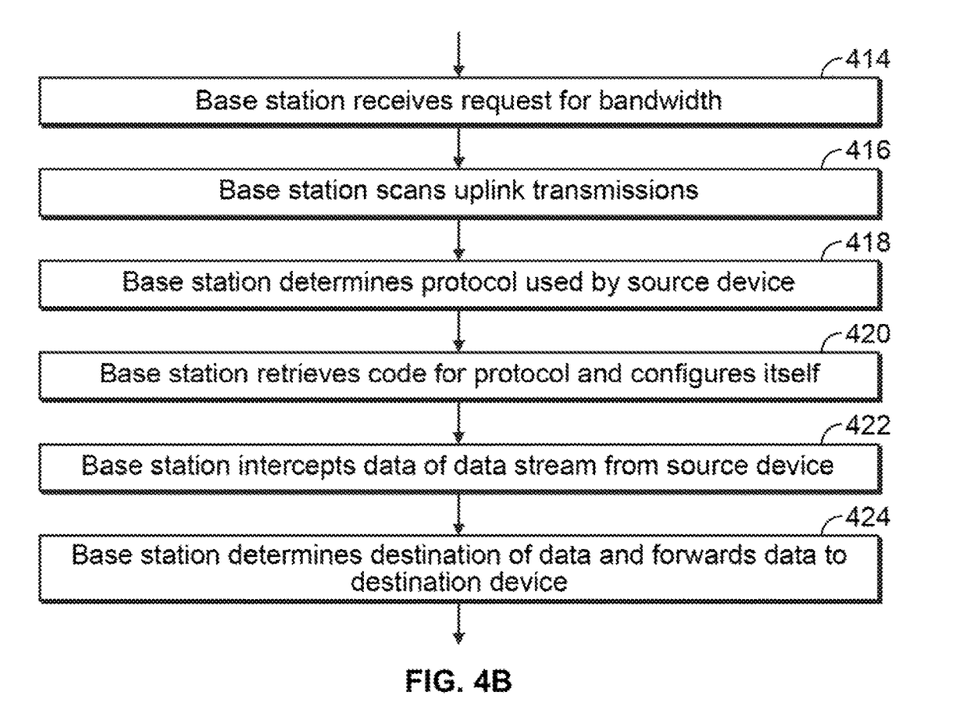
FIG. 4B is a flow diagram of example operations performed by a Base station operating as an auxiliary receiver in another scan-protocol mode.

FIG. 4B is a flow diagram of example operations performed by a base station operating as an auxiliary receiver in another scan-protocol mode. The process of FIG. 4B is similar to the process of FIG. 4A, except that instead of base station 106 self-determining that it has available bandwidth, and self-initiating the process, in FIG. 4B base station 106 receives a request for bandwidth from an entity external to base station 106 that initiates the process. FIG. 4B may be described using the example of base station 106 of FIG. 2B operating in the system of FIG. 1.

The process begins at 414 where base station 106 receives a request for bandwidth. The request for bandwidth may be received from another device such base station 102. For example, base station 102 may monitor parameters related to data stream 105 sent by device 104 on the uplink. The parameters monitored by base station 102 may include any parameters related to the quality of uplink service the base station 102 may provide to device 104. The monitored parameters may include, for example, QoS parameters such as data rate, bit error rate (BER), and packet error rate (PER) of data stream 105. The monitored parameters also may include overall traffic load/parameters on base station 102 related to other devices which could affect uplink quality for device 104. Base station 102 may monitor for a condition associated with the parameters to be met. For example, when base station 102 determines that it is not able to meet a desired service level for device 104 on the uplink, base station 102 may send, either wirelessly or through the internet, a request for bandwidth to base station 106. In this implementation, base station 106 and base station 102 may each register their presence with each other using an application that allows for communications between the two related to the requests for bandwidth. In other example implementation, the request for bandwidth sent to base station 106 may be sent from a network controller that controls the network in which base station 102 is implemented. In this ease the network controller may determine that a condition is met and bandwidth is needed based on monitoring parameters related to quality oldie uplinks of base station 102, for example, QoS parameters of data stream 105. In another example implementation, the request for bandwidth may come from device 104. In this implementation, device 104 may send the request for bandwidth when a condition is determined to be met based on the monitoring of parameters related to the quality of uplink service provided to device 104. The monitoring of parameters may be performed similar to the monitoring of parameters as described above for base station 102.

Figure 5A:
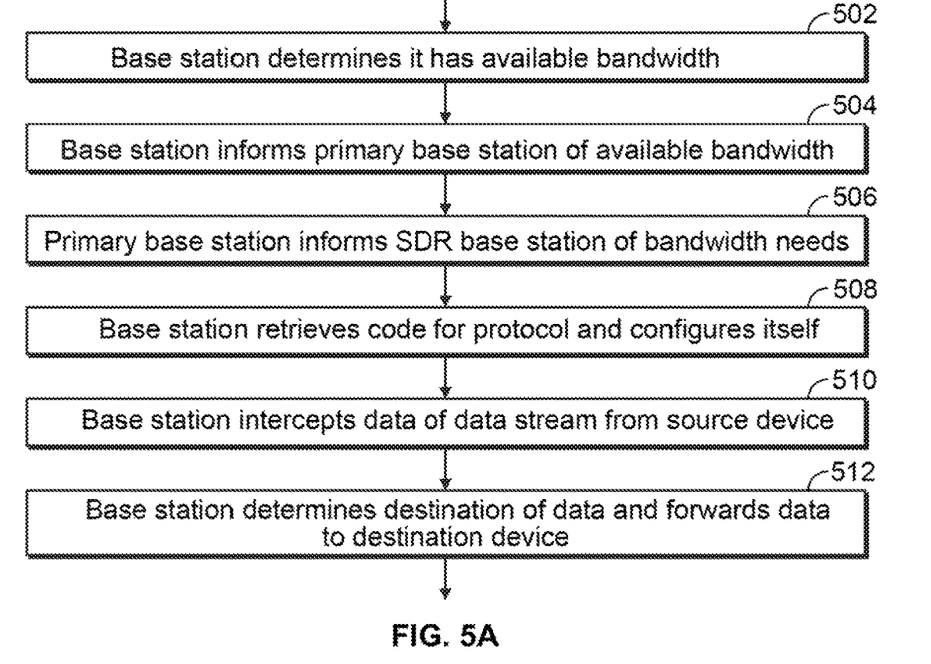
FIG. 5A is a flow diagram of example operations performed by a base station operating as an auxiliary receiver in a receive-protocol mode.

In the implementation of FIG. 4B, base station 106 may only receive a request to provide available bandwidth. In this case, the process moves to 416 where base station 106 may begin to determine ho it may provide auxiliary bandwidth. Operations 416, 418, 420, 422, and 424 of FIG. 4B, are then performed similar to operations 404, 406, 408, 410, and 412, respectively, of FIG. 4A to provide data redundancy for data stream 105. In another example implementation, at 414, base station 106 may make a determination as to whether or not it has available bandwidth before deciding to continue at 416. If base station 106 does not have bandwidth, it may send a denial of the bandwidth request back to the sending entity, FIG. 5A is a flow diagram of example operations performed by a base station operating as an auxiliary receiver in a receive-protocol mode. In receive-protocol mode the base station receives information that indicates the protocol to use when functioning as an auxiliary receiver. FIG. 5A may also be described using the example of base station 106 of FIG. 2B operating in the system of FIG. 1.

The process begins at 502 where base station 106 determines that it has available bandwidth. At 502, controller 241 may determine that base station 106 has available bandwidth and/or resources that it can use to provide auxiliary receiver service to devices, such as device 104, within its coverage area. The determination at 502 may be performed in a similar manner as was described for operation 402 of FIG. 2A.

When it is determined that base station 106 has available bandwidth the process moves to 504. At 504, base station 106 informs base station 102 (primary base station) that it has available bandwidth. At 506, base station 102 responds to base station 106 by informing base station 106 of its bandwidth needs. The bandwidth needs may be indicated to base station 106 as being in a particular protocol, for example, in a particular Wi-Fi protocol at a particular frequency. Base station 102 may also it base station 106 of a particular device, or the identity of channels, for which it needs extra bandwidth or redundancy. Next, Operations 508, 510, and 512 of FIG. 5A, are performed similar to operations 408, 410, and 412, respectively, of FIG. 4A to provide data redundancy for data stream 105.

Figure 5B:
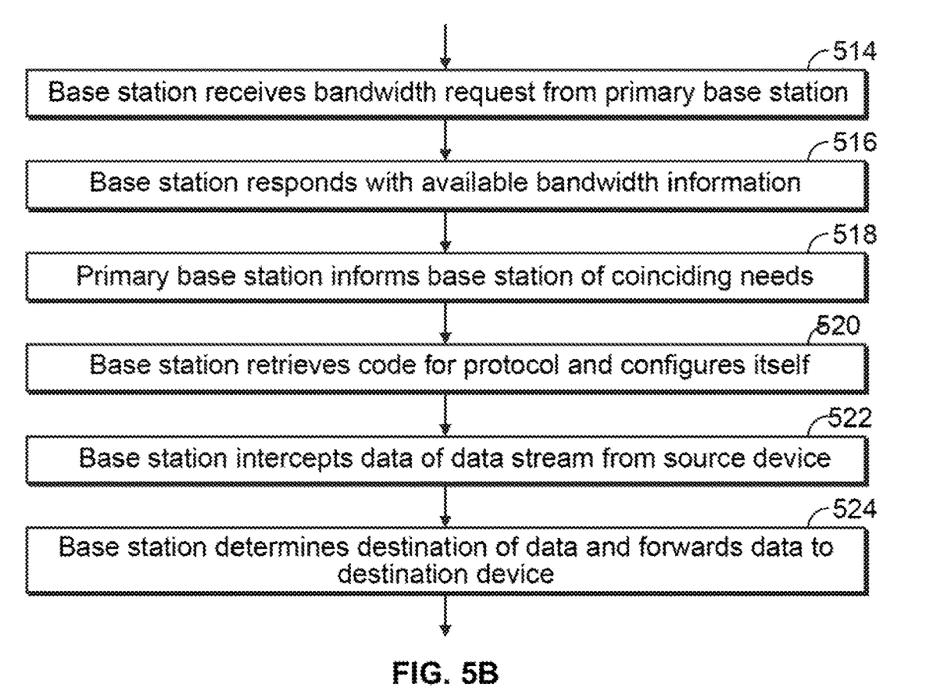
FIG. 5B is a flow diagram of example operations performed by a base station operating as an auxiliary receiver in another receive-protocol mode; and, FIG. 6 is a simplified block diagram showing an example base station operable as an auxiliary receiver.

FIG. 5B is a flow diagram of example operations performed by a base station operating as an auxiliary receiver in another receive-protocol mode. FIG. 5B may also be described using the example of base station 106 of FIG. 2B operating in the system of FIG. 1.

The process begins at 514 where base station 106 receives a request for bandwidth. The request for bandwidth may be received from another device such as base station 102. For example, base station 102 may monitor parameters related to data stream 105 sent by device 104 on the uplink. The parameters monitored by base station 102 may include any parameters related to the quality of uplink service the base station 102 may provide to device 104. The monitored parameters may include, for example, QoS parameters such as data rate, bit error rate (BER), and packet error rate (PER) of data stream 105. The monitored parameters also may include overall traffic load/parameters on base station 102 related to other devices which could affect uplink quality for deice 104. When base station 102 determines a condition has been met, for example, base station 102 is not able to meet a desired service level for device 104 on the uplink, base station 102 may send, either wirelessly or through the internet, a request or bandwidth to base station 106. In this implementation, base station 106 and base station 102 may each register their presence with each other using an application that allows for communications between the two related to the requests for bandwidth. In other example implementation, the request for bandwidth sent to base station 106 may be sent from a network controller that controls the network in which base station 102 is implemented. In this case the network controller may determine that a condition has been met and bandwidth is needed based on monitoring parameters related to quality of the uplinks of base station 102, for example, QoS parameters of data stream 105. In another example implementation, the request for bandwidth may come from device 104. In this implementation, device 104 may send the request for bandwidth upon determining a condition has been met based on the monitoring of parameters related to the quality of uplink service provided to device 104. The monitoring of parameters may be performed similar to the monitoring of parameters as described above for base station 102. At 516, base station 106 responds to base station 102 with available bandwidth information. At 518, base station 102 informs base station 106 of its bandwidth needs that coincide with the available bandwidth at base station 106. The coinciding bandwidth needs of base station 102 may be indicated to base station 106 as being in a particular protocol, for example, in a particular Wi-Fi protocol at a particular frequency. Base station 102 may also inform base station 106 of a particular device and/or the identity of channels for which it needs extra bandwidth or redundancy. Next, Operations 520, 522, and 524 of FIG. 5B, are performed similar to operations 408, 410, and 412, respectively, of FIG. 4A to provide data redundancy for data stream 105.

In other implementations, base station 106 may be used as an auxiliary receiver to receive a data stream 105ax from device 104 on the uplink, where the received data stream 105ax is different from the data stream 105 being sent by device 104 to base station 102. Base station 106 may send the received data stream 105ax onward to the destination device 128 as a data stream that includes additional data to what was sent in data stream 105 to the destination device 128 by base station 102. In other words, in this implementation data stream 105ax is not redundant, and data stream 105 and data stream 105ax each comprise diff rent data tor destination device 128. This implementation provides greater throughput on the uplink from device 104. In one example, base station 106 may communicate to device 104 that it is operating in auxiliary mode in order to allow source device 104 increase its uplink data rate to take advantage of the additional bandwidth.

Figure 6:
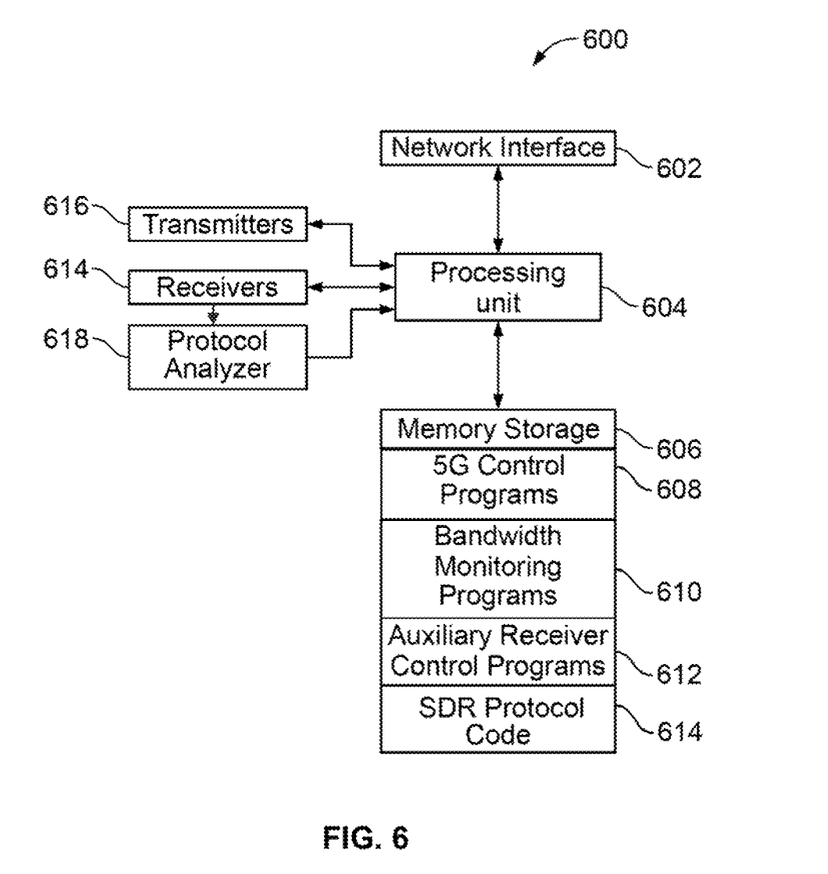

FIG. 6 is a simplified block diagram showing an example base station 600 operable as an auxiliary receiver. Base station 600 represents a possible implementation of base station 106 of FIG. 1. Base station 600 includes processing unit 604, transmitters 616, receivers 614, protocol analyzer 618, and memory/storage 606. Memory/storage 606 includes code and instructions for 5G control programs 608, bandwidth monitoring programs 610, auxiliary receiver control programs 612, and SDR protocol code 614.

Processing unit 604 may comprise one or more processors, or other control circuitry or any combination of processors and control circuitry that provide, overall control of base station 600 according to the disclosed embodiments. Memory 606 may be implemented as any type of as any type of computer readable storage media, including non-volatile and volatile memory. Protocol analyzer 618 may be configured to capture and analyze signals and data traffic received by receivers 614. Protocol analyzer 618 may then identify protocols with which the signals and data traffic are sent.

In the embodiments, execution of 5G control programs 608 causes processing unit 604 to implement operations that cause base station 600 to perform appropriate operations to operate as a 5G base station. Execution of bandwidth monitoring programs 610 causes processing unit 604 to determine if base station 600 has available bandwidth to use as an auxiliary receiver. Bandwidth monitoring programs 610 may be omitted in an implementation that receives a request for bandwidth generated at another device.

Auxiliary receiver control programs 612 cause processing unit 606 to implement operations that cause base station 600 to perform appropriate operations to operate as an auxiliary receiver. SEA protocol code 614 includes code for various protocols that may be used by processing unit to configure SDR receiver 614 for appropriate operation as an auxiliary receiver. SDR protocol code 614 may be omitted in an implementation in which base station 106 retrieves the SDR code from a remote database.

In various implementations, execution of the 5G control programs 608, bandwidth monitoring programs 610, and auxiliary receiver control programs 612, and use of the SDR protocol code 614, allows base station 600 to perform the operations shown and describer in relation to FIG. 3, FIGS. 4A-4B, and FIGS. 5A-5B.

The example embodiments disclosed herein may be described in the general context of processor-executable code or instructions stored on memory that may comprise one or more computer readable storage media (e.g., tangible non-transitory computer-readable storage media such as memory 606). As should be readily understood, the terms "computer-readable storage media" or "non-transitory computer-readable media" include the media for storing of data, code and program instructions, such as memory 606, and do not include portions of the media for storing transitory propagated or modulated data communication signals.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuit, circuitry or combinations of processors and or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

The disclosed implementations include a first base station comprising a receiver including a definable radio portion, one or more processors in communication with the receiver, and memory in communication with the one or more processors, the memory comprising code that, when executed, causes the one or more processors to control the first base station to determine a protocol used by a source device on an uplink from the source device to a second base station, configure the definable radio portion of the receiver to operate according to the protocol, intercept, using the receiver, a data stream sent to the second base station on the uplink, the data stream intended for a destination device; and, send the intercepted data stream onward as a redundant data stream for the destination device. The code may be further executable to cause the one or more processors to control the first base station to determine that the first base station is to operate in an auxiliary mode, and configure the definable radio portion of the receiver, intercept the data stream, and send the intercepted data stream onward while operating in the auxiliary mode. The code may be executable to cause the one or more processors to control the first base station to determine that the first base station is to operate in the auxiliary mode by controlling the first base station to determine that the first base station has available bandwidth, send an indication of the available bandwidth to a network device, and receive an indication of bandwidth needs from the network device. The code may be executable to cause the one or more processors to control the first base station to determine that the first base station is to operate in the auxiliary mode by controlling the first base station to monitor at least one parameter at the first base station, and initiate operation in the auxiliary mode based at least one on the at least one parameter. The code may be executable to cause the one or more processors to control the first base station to determine that the first base station is to operate in the auxiliary mode by controlling the first base station to receive a request for bandwidth frons a network device, and initiate operation in the auxiliary mode based at least one on the request for bandwidth. The network device may be the second base station. The network device may be the source device. The first base station may operate in a primary mode or in an auxiliary mode, and the code may be further executable to cause the one or more processors to control the first base station to operate in the primary mode, determine that the first base station is to operate in the auxiliary mode, switch to operate in the auxiliary mode by configuring the definable radio portion of the receiver to operate according to the protocol, and, intercept the data stream and send the intercepted data stream onward while operating in the auxiliary mode. The code may be further executable to cause the one or more processors to control the first base station to determine that the first base station is to operate in the primary mode, and switch the receiver back from auxiliary mode to operate in primary mode. The code may comprise first code and the first code may executable to cause the one or more processors to control the first base station to configure the definable radio portion of the receiver by controlling the apparatus to obtain second code, the second code defining the protocol, and configure the definable radio portion using the second code. The first base station may further comprise a transmitter in communication with the one or more processors, and, the code, when executed, may further cause the one or more processors to control the first base station to transmit a beacon signal from the transmitter indicating that the first base station supports provision of additional bandwidth, receive a request for bandwidth from the source device in response to the beacon signal, and determine the protocol used by the source device for the uplink from the source device to the second base station based at least in part on the request for bandwidth. The first base station may further comprise a transmitter in communication with the one or more processors, and, the code, when executed, may further cause the one or more processors to control the first base station to send a signal to the source device indicating that the first base station is operating in auxiliary mode and that the source device has been provided auxiliary bandwidth.

The disclosed implementations also include a first base station comprising a receiver including a definable radio portion, one or more processors in communication with the receiver, and memory in communication with the one or more processors, the memory comprising code that, when executed, causes the one or more processors to control the first base station to determine a protocol used by a source device on an uplink from the source device to a second base station, configure the definable radio portion of the receiver to operate according to the protocol, receive, using the receiver, a data stream on the uplink, the data stream intended for a destination device, and send the data stream onward for the destination device. The first base station may operate in a primary and an auxiliary mode, and the code may further be executable to cause the one or more processors to control the first base station to operate in primary mode, determine that the first base station is to operate in the auxiliary mode, and configure the definable radio portion of the receiver, receive the data stream on the uplink, and send the data stream onward for the destination device while in the auxiliary mode. The code may be executable to cause the one or more processors to control the first base station to determine that the first base station is to operate in the auxiliary mode by controlling the first base station to determine that the first base station has available bandwidth, send an indication of the available bandwidth to a network device, and receive an indication of bandwidth needs from the network device. The code may be executable to cause the one or more processors to control the first base station to determine that the first base station is to operate in the auxiliary mode by controlling the first base station to monitor at least one parameter at the first base station, and determine that the first base station is to Operate in the auxiliary mode based at least one on the at least one parameter. The code may be executable to cause the one or more processors to control the first base station to receive the data stream by controlling the first base station to intercept, using the receiver, the data stream on the uplink, wherein the data stream is sent to the second base station and intended for a destination device, and send the data stream onward as a redundant data stream for the destination device. The code may be executable to cause the one or more processors to control the first base station to receive the data stream on the uplink by controlling the first base station to receive the data stream on the uplink, wherein the data stream is sent to the first base station and intended for the destination device, and send the data stream onward for the destination device.

The disclosed implementations further include a network comprising an auxiliary base station configured to determine the protocol used by a source device on an uplink channel, configure a receiver of the auxiliary base station to operate according to the protocol, intercept a data stream sent on the uplink channel from a source device to a primary base station, and, send the intercepted data stream onward to the destination device through a network path. The network may further comprise the primary base station, and the primary base station may be configured to determine that a condition on the uplink channel has been met and, in response to the condition being met, send a request for bandwidth to the auxiliary base station, and, the auxiliary base station may be further configured to, in response to receiving the request for bandwidth, determine the protocol, configure the receiver, and intercept the data stream. The network may further comprise a network controller, wherein the network controller is configured to determine that a condition on the uplink channel has been met and, in response to the condition being met, send a request for auxiliary bandwidth to the auxiliary base station, and, wherein the auxiliary base station is further configured to, in response to receiving the request, determine the protocol, configure the receiver, and intercept the data stream. The network may further comprise the source device, wherein the source device is configured to determine that a condition on the uplink channel has been met and, in response to the condition being met, send a request for auxiliary bandwidth to the auxiliary base station, and, wherein the auxiliary base station is further configured to, in response to receiving the request, determine the protocol, configure the receiver, and intercept the data stream.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may be combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications a falling within the scope of the appended claims.

What is claimed is:

1. A first base station comprising:
   a wireless receiver configured to communicate in accordance with a plurality of protocols;
   a processor; and
   a memory in communication with the processor, the memory comprising executable instructions that, when executed by the processor, cause the processor to control the first base station to perform functions of:
   determining whether to operate in a primary mode or in an auxiliary mode, wherein while operating in the auxiliary mode, the first base station provides an additional bandwidth for a source device that is in communication with a second base station different from the first base station;
   in response to determining to operate in the auxiliary mode:
     scanning a range of frequencies and detecting an uplink transmission sent by the source device to the second base station;
     based on the detected uplink transmission, determining, from the plurality of protocols, a protocol used by the source device for the uplink transmission;
     configuring the wireless receiver to operate according to the determined protocol used by the source device for the uplink transmission;
     intercepting, using the wireless receiver operating according to the determined protocol, a first data stream sent from the source device to a destination device via the second base station, the first data stream being addressed to the destination device; and
     sending, to the destination device, the intercepted first data stream as a second data stream, wherein the second data stream is a redundant data stream with respect to the first data stream.

2. The first base station of claim 1, wherein:
   the wireless receiver includes a software definable radio (SDR), and
   the SDR is configured to intercept the first data stream and send the second data stream to the destination device while the first base station is operating in the auxiliary mode.

3. The first base station of claim 2, wherein, to determine to operate in the auxiliary mode, the instructions, when executed by the processor, further cause the processor to control the first base station to perform functions of:
   determining that the first base station has an available bandwidth;
   sending an indication of the available bandwidth to a network device; and
   receiving an indication of bandwidth needs from the network device.

4. The first base station of claim 3, wherein the network device is the source device or the second base station.

5. The first base station of claim 2, wherein, to determine that the first base station is to operate in the auxiliary mode, the instructions, when executed by the processor, further cause the processor to control the first base station to perform functions of:
monitoring a parameter at the first base station; and
initiating to operate in the auxiliary mode based on the parameter.

6. The first base station of claim 2,
wherein, to determine that the first base station is to operate in the auxiliary mode, the instructions, when executed by the processor, further cause the processor to control the first base station to perform functions of:
receiving a request for bandwidth from a network device; and
initiating to operate in the auxiliary mode based on the request for bandwidth.

7. The first base station of claim 6, wherein the network device is the source device or the second base station.

8. The first base station of claim 1, wherein:
the wireless receiver includes a software definable radio (SDR) configured to operate according to the determined protocol, and
the first base station intercepts the first data stream while the first base station is operating in the auxiliary mode.

9. The first base station of claim 8, wherein the instructions, when executed by the processor, further cause the processor to control the first base station to perform functions of:
determining that the first base station is to operate in the primary mode; and
switching back from the auxiliary mode to operate in the primary mode.

10. The first base station of claim 1, wherein:
the wireless receiver includes a software definable radio (SDR), and
to configure the wireless receiver, the instructions further include instructions that, when executed by the processor, cause the processor to control the first base station to perform functions of:
obtaining a code defining the determined protocol; and
configuring the SDR using the code.

11. The first base station of claim 1, wherein the instructions, when executed by the processor, further cause the processor to control the first base station to perform functions of:
transmitting a signal indicating that the first base station is capable of providing the additional bandwidth; and
receiving a request for the additional bandwidth from the source device in response to the transmitted signal,
wherein the first base station determines to operate in the auxiliary mode in response to the request for the additional bandwidth.

12. The first base station of claim 1, wherein, the instructions, when executed by the processor, further cause the processor to control the first base station to perform a function of sending a signal to the source device indicating that the first base station is operating in the auxiliary mode and that the source device has been provided with an auxiliary bandwidth.

13. A method for operating a first base station comprising a wireless receiver configured to communicate in accordance with a plurality of protocols, the method comprising:
determining whether to operate in a primary mode or in an auxiliary mode, wherein while operating in the auxiliary mode, the first base station provides an additional bandwidth for a source device that is in communication with a second base station different from the first base station;
in response to determining to operate in the auxiliary mode:
scanning a range of frequencies and detecting an uplink transmission from the source device to the second base station;
based on the detected uplink transmission, determining, from the plurality of protocols, a protocol used by a source device for the uplink transmission;
configuring the wireless receiver to operate according to the determined protocol used by the source device for the uplink transmission;
intercepting, using the wireless receiver operating according to the determined protocol, a first data stream sent from the source device to a destination device via the second base station, the first data stream being addressed to the destination device; and
sending, to the destination device, the intercepted first data stream as a second data stream, wherein the second data stream is a redundant data stream with respect to the first data stream.

14. The method of claim 13, wherein:
the wireless receiver includes a software definable radio (SDR), and
the SDR is configured to intercept the first data stream and send the second data stream to the destination device while the first base station is operating in the auxiliary mode.

15. The method of claim 14, wherein determining to operate in the auxiliary mode includes at least one of:
determining that the first base station has an available bandwidth;
monitoring at least one parameter at the first base station; and
receiving a request for bandwidth from a network device.

16. The method of claim 15, wherein the network device is one of the second base station and source device.

17. The method of claim 13, wherein:
the wireless receiver includes a software definable radio (SDR) configured to operate according to the determined protocol, and
the first base station intercepts the first data stream while the first base station is operating in the auxiliary mode.

18. The method of claim 13, further comprising:
transmitting a signal indicating that the first base station is capable of providing the additional bandwidth; and
receiving a request for bandwidth from the source device in response to the transmitted signal,
wherein the first base station determines to operate in the auxiliary mode in response to the request for the additional bandwidth.

19. The method of claim 13, further comprising sending a signal to the source device indicating that the first base station is operating in the auxiliary mode and that the source device has been provided with an auxiliary bandwidth.

20. A non-transient computer readable medium containing instructions which, when executed by a processor of a first base station, causes the first base station to perform functions of:
determining whether to operate in a primary mode or in an auxiliary mode, wherein while operating in the auxiliary mode, the first base station provides an additional bandwidth for a source device that is in communication with a second base station different from the first base station;

in response to determining to operate in the auxiliary mode:
  scanning a range of frequencies and detecting an uplink transmission from the source device to the second base station;
  based on the detected uplink transmission, determining, from a plurality of protocols, a protocol used by a source device for the uplink transmission;
  configuring a wireless receiver to operate according to the determined protocol used by the source device for the uplink transmission, wherein the wireless receiver is configured to communicate in accordance with the plurality of protocols;
  intercepting, using the wireless receiver operating according to the determined protocol, a first data stream sent from the source device to a destination device via the second base station,
  the first data stream being addressed to the destination device; and
  sending, to the destination device, the intercepted first data stream as a second data stream,
  wherein the second data stream is a redundant data stream with respect to the first data stream.

21. The non-transient computer readable medium of claim 20, wherein the first data stream is intercepted while the first base station operates in the auxiliary mode.

22. The non-transient computer readable medium of claim 21, wherein, to determine that the first base station is to operate in the auxiliary mode, the instructions further causing the first base station to perform at least one of functions of:
  determining that the first base station has an available bandwidth;
  monitoring a parameter at the first base station; and
  receiving a request for bandwidth from a network device.

* * * * *